United States Patent
Baccini

(10) Patent No.: US 6,847,133 B2
(45) Date of Patent: Jan. 25, 2005

(54) LINEAR MOTOR AND METHOD TO MANUFACTURE SAID LINEAR MOTOR

(76) Inventor: Gisulfo Baccini, Via Duca d'Acosta, 1 - 31030 Mignagola di Carbonera (IT)

( * ) Notice: Subject to any disclaimer, the term of this patent is extended or adjusted under 35 U.S.C. 154(b) by 0 days.

(21) Appl. No.: 10/321,329

(22) Filed: Dec. 16, 2002

(65) Prior Publication Data

US 2003/0111916 A1 Jun. 19, 2003

(30) Foreign Application Priority Data

Dec. 14, 2001 (IT) .................................. UD2001A0209

(51) Int. Cl.⁷ ............................................. H02K 41/02
(52) U.S. Cl. .......................................... 310/12; 29/596
(58) Field of Search ......................... 29/596, 597, 598; 310/12, 13, 14

(56) References Cited

U.S. PATENT DOCUMENTS

| | | | | |
|---|---|---|---|---|
| 3,972,214 A | * | 8/1976 | Jagersberger | 72/132 |
| 4,329,308 A | * | 5/1982 | Langer et al. | 264/162 |
| 4,749,921 A | | 6/1988 | Chitayat | 318/135 |
| RE34,674 E | * | 7/1994 | Beakley et al. | 310/12 |
| 5,808,381 A | | 9/1998 | Aoyama et al. | 310/12 |
| 6,084,319 A | * | 7/2000 | Kamata et al. | 310/12 |
| 6,140,734 A | | 10/2000 | Hazelton et al. | 310/198 |
| 6,144,118 A | * | 11/2000 | Cahill et al. | 310/12 |
| 6,274,961 B1 | * | 8/2001 | Baumann et al. | 310/214 |
| 6,313,550 B1 | * | 11/2001 | Binnard et al. | 310/12 |
| 6,313,552 B1 | * | 11/2001 | Boast | 310/14 |
| 6,407,471 B1 | * | 6/2002 | Miyamoto et al. | 310/12 |
| 6,452,292 B1 | * | 9/2002 | Binnard | 310/12 |

FOREIGN PATENT DOCUMENTS

| | | |
|---|---|---|
| DE | 197 29 974 A1 | 1/1999 |
| GB | 2 352 094 A | 1/2001 |
| JP | 11196561 A * | 7/1999 ......... H02K/41/035 |

* cited by examiner

Primary Examiner—Thanh Lam
Assistant Examiner—Judson H. Jones
(74) Attorney, Agent, or Firm—Akin Gump Strauss Hauer & Feld, LLP

(57) ABSTRACT

Linear motor and method to make the same. The motor comprises an armature equipped with compartments (15) inside which are housed electric coils (16), and two fixed bars (22) cooperating with respective sides of the armature, on each of which are mounted permanent magnets (12) arranged facing said electric coils (16). The armature (14) is made mainly of aluminium or of ceramic material. The armature (14) comprises interruptions (21) defining zones of electric discontinuity in cooperation the perimeter of the compartments (15) housing the coils (16).

19 Claims, 3 Drawing Sheets

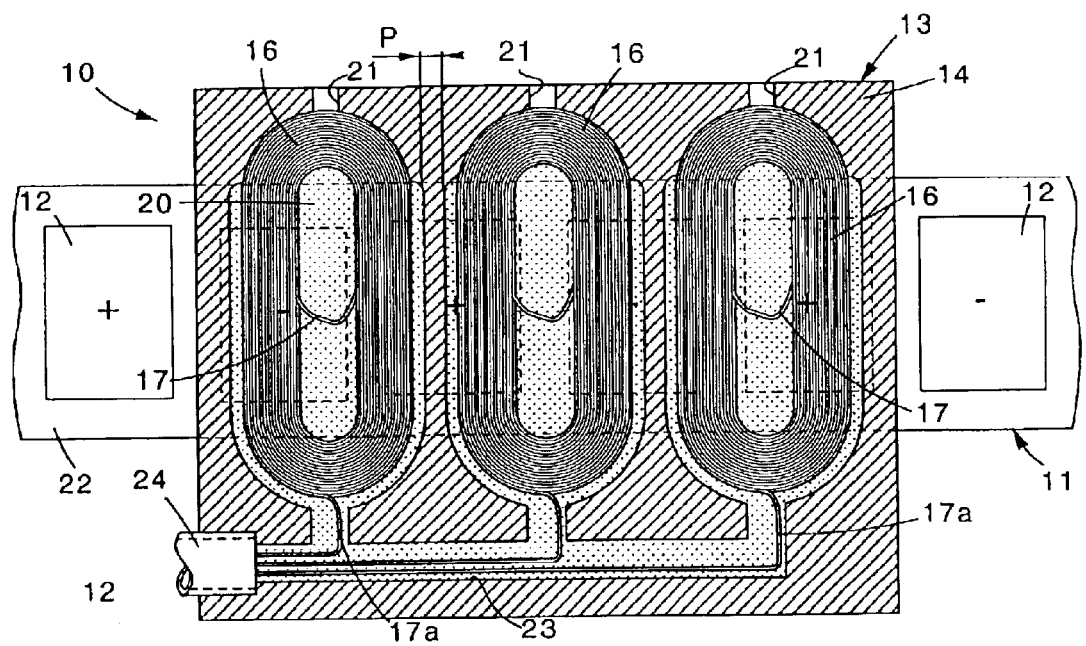
fig. 3
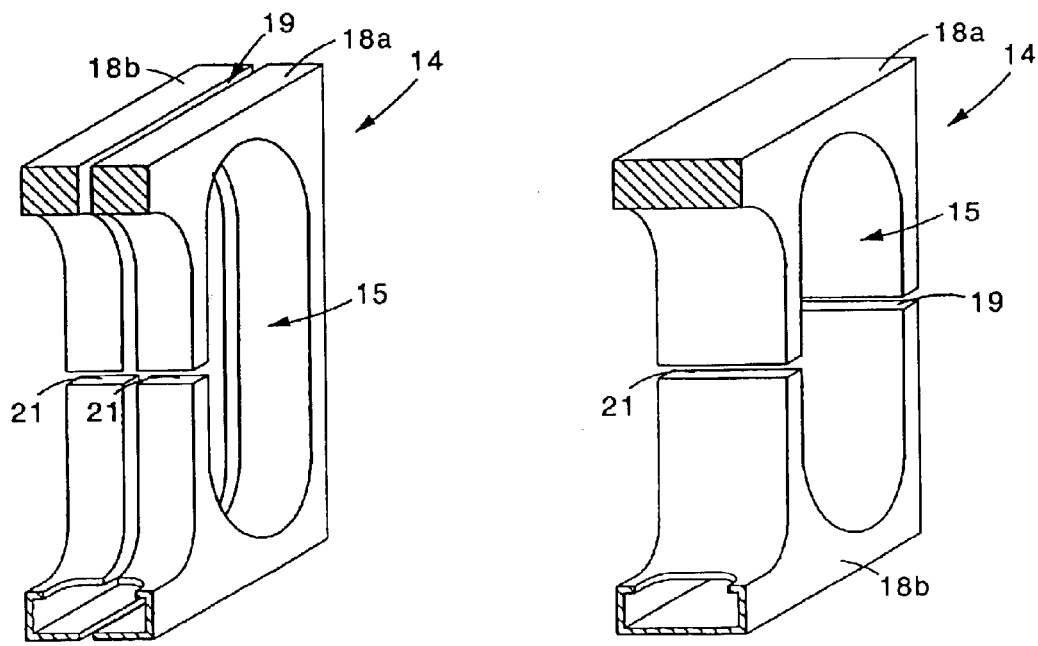
fig. 4
fig. 5

LINEAR MOTOR AND METHOD TO MANUFACTURE SAID LINEAR MOTOR

FIELD OF THE INVENTION

The invention concerns a linear motor of the synchronous brushless type excited by permanent magnets.

To be more exact, the invention concerns a linear motor of the type comprising a mobile armature, slider or cursor, equipped with a plurality of compartments inside which respective electric coils are stably housed, and two fixed bars, one for each side of the armature, on which a plurality of permanent magnets are mounted and arranged, during use, facing said electric coils.

The invention also concerns the method to manufacture said linear motor.

BACKGROUND OF THE INVENTION

The state of the art, as disclosed for example in GB-A-2.352.954, includes synchronous brushless linear electric motors of the general type as described above. Such motors comprise a mobile part which normally consists of an armature or frame on which the housing compartments are made, normally equidistant, inside which electric coils associated with feed means are inserted and clamped.

A relative fixed bar, normally made of ferromagnetic material, is present in a position facing at least one side of the armature; a plurality of permanent magnets are mounted on the fixed bar, arranged aligned and usually equidistant in the direction of movement of the armature which carries the electric coils. The magnets have alternating polarities.

In other constructional embodiments, the motor can have the fixed part comprising the electric coils and the mobile part comprising the permanent magnets.

The armature where the coils are housed and the ferromagnetic bar on which the magnets are mounted are separated from each other by an air interspace.

The working principle of linear motors of this type exploits the force of repulsion which is created by sequentially inverting the direction of circulation of the electric current circulating in a coil every time the coil moves from a position facing a magnet with a certain polarity, for example, positive, to a position facing a magnet with a negative polarity.

In conventional motors (see for example U.S. Pat. No. 6,140,734), the coils are buried in an insulating material, for example resin, inside the respective housing compartment of the armature, and are cemented in the furnace by means of heat treatment which causes the resin to be activated (melted) and penetrate between the spirals of the coil. The insulating material is necessary to eliminate phenomena of magnetic friction between adjacent coils which cause a deterioration to the performance of the motor.

The insulating material, having set between the spirals of the coil, also acts as a mechanical support for the stable housing of the coils in the relative compartments of the armature, in order to ensure a precise positioning with respect to the fixed magnets.

However, it has been found that using a hot cementing process on insulating material causes a lack of mechanical rigidity due to the interstices between the spirals which are not completely filled, particularly in the inner compartment of the coils. When the motor is used at high frequency conditions, in the long term mechanical stresses are created on the coil which lead to a loosening of the spirals which are thus exposed to the environment, with negative repercussions on the functioning and efficiency of the motor.

The presence of interstices between the spirals causes a deterioration in the interaction conditions of the magnetic fields produced respectively by the current circulating in the coils, and by the permanent magnets, with a reduction in the value of the force of repulsion which drives the motor.

Moreover, the presence of insulating material functioning as a mechanical support for the coils determines a low capacity to dissipate the heat generated by the Joule effect, with consequent problems of overheating in the armature of the coils.

The present Applicant has devised and embodied this invention to solve the shortcomings of the state of the art, and to obtain further advantages.

SUMMARY OF THE INVENTION

The invention is set forth and characterized essentially in the respective main claims, while the dependent claims describe other innovative characteristics of the invention.

The purpose of the invention is to achieve a brushless linear motor of the synchronous type, with permanent magnets in an ironless configuration, which has improved characteristics of mechanical resistance to stresses, heat dissipation, structural stability of the spirals buried in the armature, smaller overall bulk, efficiency and speed of response.

In accordance with this purpose, according to a first characteristic, the linear motor according to the invention comprises a structural armature made mainly of aluminium, or alloys thereof, in which the compartments are made to stably house a plurality of mating coils associated with electric feed means.

According to another characteristic, the structural armature is made mainly of ceramic material.

Using a structural armature made mainly of aluminium, or alloys thereof, or ceramic material, allows to guarantee great mechanical rigidity while keeping the overall weight limited, even in conditions of great stress, for example deriving from a prolonged use of the motor at high frequencies.

Moreover, the structural armature made of aluminium or ceramic ensures a great capacity of heat dissipation, which prevents possible overheating deriving from a prolonged circulation of electric current in the spirals of the coils.

According to another characteristic of the invention, the structural armature made of aluminium or ceramic has, in cooperation with at least a segment of the perimeter surrounding said compartments housing the coils, interruptions which define electric discontinuities and are able to prevent the electric circuit from closing on the armature itself; these interruptions are also able to avoid that the currents induced on the armature flow freely along the armature itself and disturb the operation of the motor.

In a first embodiment the interruptions or discontinuities are made on a lateral segment of the armature which separates two adjacent housing compartments of relative coils. According to another embodiment, the interruptions or discontinuities are made in cooperation with an upper or lower segment of the relative housing compartment.

According to a preferential embodiment of the invention, the aluminium or ceramic structural armature which defines the housing compartments of the coils comprises at least a module made in two bodies which can be coupled together after the electric coils have been inserted inside them.

In an advantageous embodiment, once coupled, the two bodies are able to define casting fissures inside which an insulating material is poured in the liquid or melted state, for example polymerizable resin or other material comparable therewith.

During the casting, the insulating material penetrates in depth until it fills all the interstices between the spirals of the coils, and also the inner compartment of the coils. The resin sets and stabilizes, by means of polymerization, forming a stable whole with the relative coils; this whole guarantees absolute mechanical stability, electric insulation, good capacity of heat dissipation and that there are no empty spaces where electricity cannot be not conducted.

In another advantageous embodiment, the two bodies which form the armature are specular and each defines a respective half of the armature. In a first embodiment, the two bodies are coupled together on a substantially vertical plane; in another embodiment, the two bodies are coupled on a substantially horizontal plane.

According to one embodiment of the invention, on a plane transverse to the direction of advance of the mobile armature, the motor comprises two coils, or multiples of two, adjacent and substantially parallel, made by means of a single continuous winding.

Using a single winding to form two adjacent coils, the two ends of the conductor, connected to the source of feed to form the electric circuit, always emerge from the outer periphery, respectively of one and the other coil, remaining contained inside the lateral bulk of the coil itself. With this configuration there are no lateral thicker parts formed due to the end of the conductor emerging from the armature, which thicker parts can compromise an efficient filling of the empty spaces by the insulating material and hence create problems of correct electric conduction, heat dissipation and mechanical stability.

In a preferential embodiment, the armature comprises at least a module, comparable from the electric point of view with a single coil, configured dimensionally so as to contain two pairs of coils, or multiples of two, arranged aligned in the direction of motion.

According to a variant, the module is suitable to contain three pairs of coils, or multiples of three, arranged aligned in the direction of motion.

The module has a size, in the direction of movement, such as to cover an even number of magnets so that, during the movement of the mobile part of the motor, the sign of the magnet which is left is always equal to the sign of the new magnet which is covered by the armature which bears the coils. In this way, the induced currents which are generated between adjacent magnets and which circulate on the metal armature are mutually cancelled and therefore do not oppose, or in any case create interference with, the motion and/or the performance of the motor.

BRIEF DESCRIPTION OF THE DRAWINGS

These and other characteristics of the invention will be apparent from the following description of some preferential forms of embodiment, given as a non-restrictive example, with reference to the attached drawings wherein:

FIG. 3 shows a variant of FIG. 2;

FIG. 4 shows a detail of the coil-bearing armature of the linear motor of FIG. 1;

FIG. 5 shows a variant of FIG. 4;

DETAILED DESCRIPTION OF SOME PREFERENTIAL EMBODIMENTS

Figure 1:
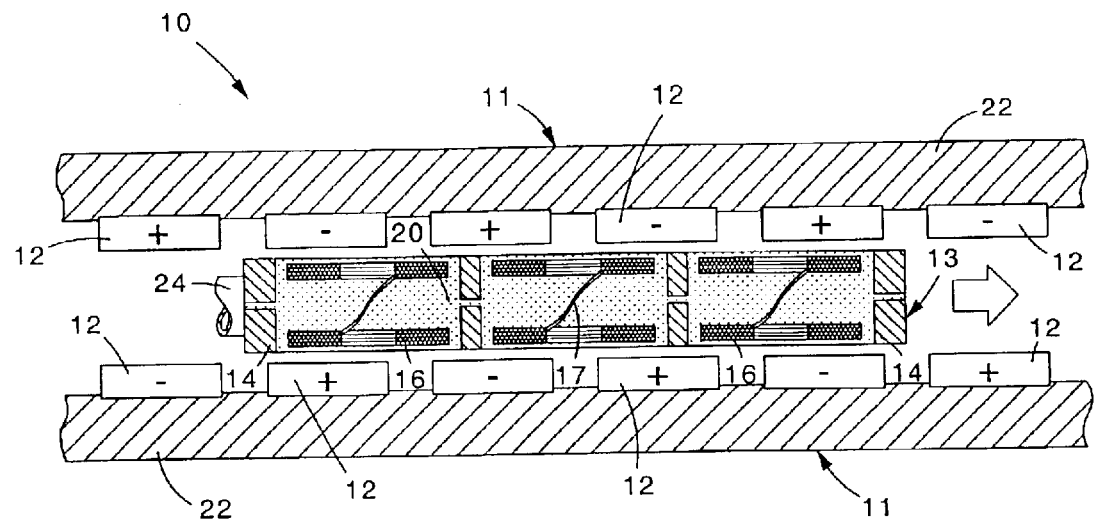
FIG. 1 is a plane view of a linear motor according to the invention.

With reference to the attached figures, a synchronous brushless linear motor according to the invention is indicated generally by the reference number 10. It comprises a fixed part 11 which, in this case, comprises two opposite bars 22, made of ferromagnetic material, on which a plurality of permanent magnets 12 are mounted, substantially equidistant and with reciprocally alternating polarity.

The motor 10 also comprises a mobile part 13, arranged in the interspace between the two bars 22, consisting of a frame or armature 14 made mainly of aluminium or its alloys, or of ceramic material.

The armature 14 is suitable to define a plurality of compartments 15 to house mating electric coils 16. In this case, the housing compartments 15 are substantially quadrangular in shape: the lateral segments are straight and the upper and lower segments are curved.

Using aluminium or its alloys or ceramic material as the material for the armature 14 ensures a lighter weight, greater mechanical rigidity, good capacity to dissipate heat and good electric conductivity.

In this case, the armature 14 is made of modules, each comprising three pairs of coils 16 arranged aligned along the direction of motion, each pair comprising two coils 16 arranged adjacent on a plane transverse to the direction of motion and parallel to each other.

Figure 6:
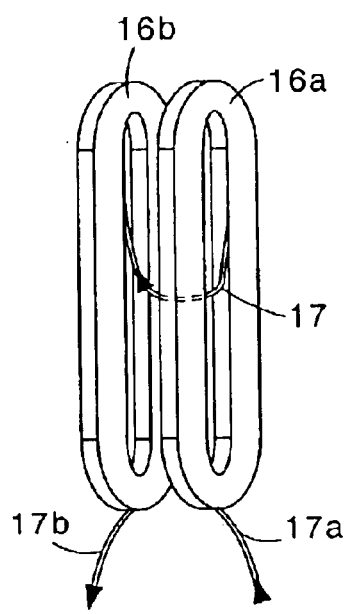
FIG. 6 is a prospective view of two, electrically connected coils as used in the linear motor shown in FIG. 1.
Figure 7:
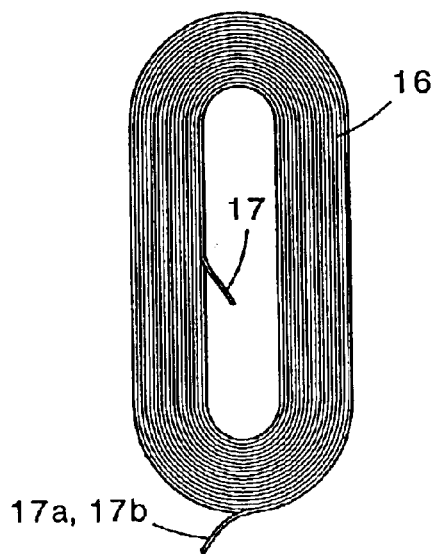
FIG. 7 is a front view of a coil used in the linear motor in FIG. 1.
Figure 8:
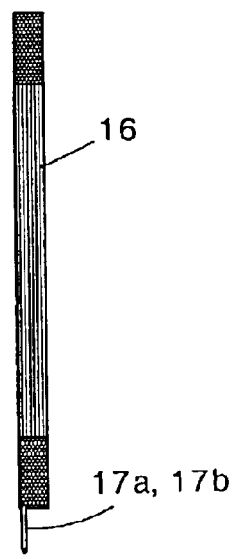
FIG. 8 is a transverse section of the coil shown in FIG. 6.

The two coils 16 of each pair are made (FIG. 6) with a single conductor 17 wound continuously. The first coil 16a is formed by winding the conductor 17, starting from a first end 17a connected to a source of feed, developing from the outside towards the inside of the coil. The second coil 16b is formed by winding the conductor 17 developing from the inside to the outside, so that the second end 17b connected to the source of feed is, like the first 17a, also on the outer periphery of the relative coil.

Thanks to this configuration, with a double adjacent coil 16a and 16b, the two ends 17a and 17b which emerge from the armature 14 remain contained within the lateral bulk of the relative coil, respectively 16a and 16b; therefore no thicker parts are created on the sides which might cause empty spaces and interstices which would compromise the electric conduction and weaken the mechanical rigidity of the whole. Moreover, the value of the air gap is optimized.

The armature 14 is made, in this case, in two half-bodies substantially specular and divided (FIG. 4) on a vertical plane, respectively 18a and 18b, able to be coupled together so as to constitute a single body. According to the variant shown in FIG. 5, the two half-bodies 18a and 18b are divided on a horizontal plane.

After the coils 16a, 16b have been inserted and assembled into the respective housing compartments 15, the two half-bodies 18a and 18b are closed and made integral with each other; in this assembled position, in correspondence with part of the coupling perimeter, fissures 19 are formed through which an insulating and binding material in a liquid or melted state, for example resin 20, is cast.

According to the invention, therefore, the armature 14 functions as a mold for casting the melted resin 20, which penetrates into the interstices between the spirals of the relative coils 16a, 16b, filling all the empty spaces and the fissures between the spirals and the armature 14 and the inner compartment of the coils.

When the resin 20 polymerizes and is chemically stabilized, it constitutes a single block with the relative coils 16a, 16b, forming a conductive whole which, with regard to the permanent magnets 12, behaves substantially as a single spiral.

This single block, without interstices and empty spaces, ensures a considerable mechanical rigidity which allows a prolonged use of the motor even at high frequencies, without the risk of failure or loosening. Moreover, absorption and the contact of the conductor 17 with contaminating material such as water, oil, dust or otherwise is limited to a minimum, or even totally eliminated.

To prevent the electric current from closing entirely on the aluminium armature 14, apertures or interruptions of electric discontinuity are provided in a position surrounding the relative compartments 15 housing the coils 16a, 16b. When the resin is applied, the apertures of electric discontinuity 21 are also completely filled with resin 20.

Figure 2:
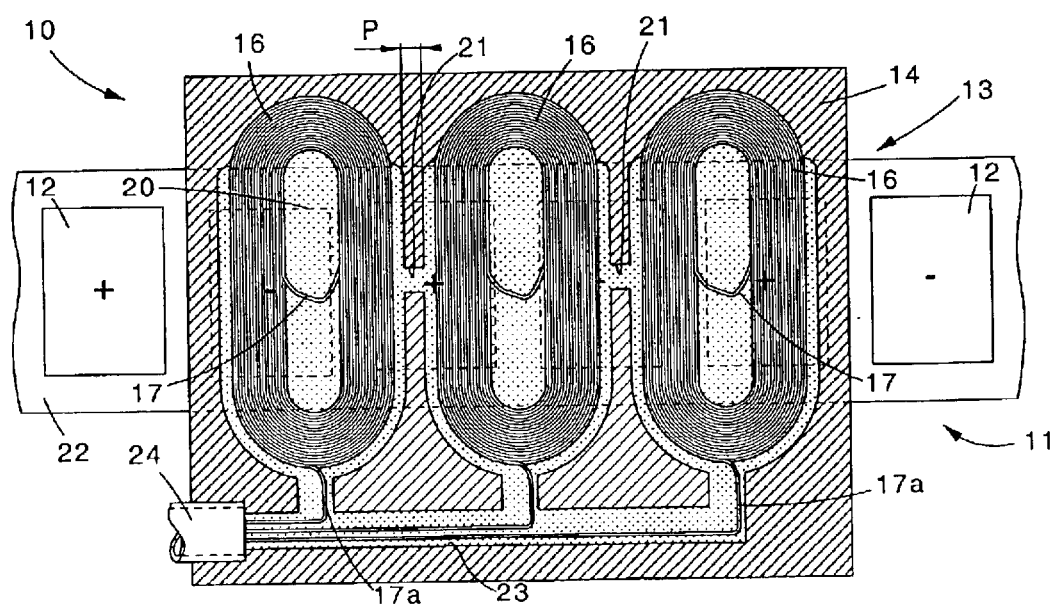
FIG. 2 is a part longitudinal section of the motor in FIG. 1.

In the embodiment shown in FIG. 2, the apertures of discontinuity 21 are made on the lateral segments of the housing compartments 15 whereas, in the variant shown in FIG. 3, the apertures 21 are made on the upper segment of the relative compartment 15. In cooperation with the lower part of the armature 14 there is a channel 23 which allows the ends of the conductors of each of the coils 16a, 16b to emerge; the ends are joined by means of a connector 24 which is connected to a source of feed, not shown here.

In one embodiment of the invention, the longitudinal size of the armature 14 is such as to cover during use an even number of permanent magnets 12, in this case four; in this way, the polarity of the new magnet 12 facing the coils 16a, 16b during the movement of the mobile part 13 is equal to the polarity of the magnet 12 which remains uncovered after said part 13 has moved.

This geometric configuration is advantageous from the electric point of view, since it leads to an annulment of parasitic electric currents which close between magnet and magnet using the armature 14 as an electric circuit.

In a further form of embodiment, the armature 14 is made in such a manner that the distance "p" between two adjacent housing compartments 15 is equal to, or less than, the distance between two adjacent permanent magnets 12. In this way, the metal part of the armature 14 between two adjacent coils 16 does not function as a further spiral, thus interfering with the correct functioning of the electric motor 10.

It is clear however that modifications and/or additions can be made to the linear motor 10 and its method of manufacture as described heretofore without departing from the field and scope of the present invention.

For example, the armature 14 carrying the coils 16a, 16b could be fixed while the bars 22 with the permanent magnets 12 could be mobile. It is also within the spirit of the invention that the armature 14 comprises several modules with other than three coils 16 aligned longitudinally, or that it comprises four, six or more coils transversely adjacent, so as not to have lateral thicker parts with respect to the coils.

It also comes within the field of the invention that the longitudinal development of the armature 14 covers two, six or more permanent magnets 12, or the armature 14 comprises parts, for example external, not made completely of aluminium or ceramic.

The insulating and binding material used to stabilize and electrically insulate the coils 16 could be something other than resin, provided that it has substantially the same physical-chemical characteristics.

What is claimed is:

1. A linear motor comprising an armature having first and second sides and equipped with a plurality of compartments (15) inside of which are stably housed respective electric coils (16), the motor including two fixed bars (22), each bar cooperating with the first or second side, respectively, of said armature, each bar having a plurality of permanent magnets (12) mounted thereto and arranged, during use, facing said electric coils (16), wherein said armature (14) is made mainly of aluminium or its alloys, or of ceramic material, said armature (14) including interruptions (21) defining zones of electric discontinuity which cooperate at least with the perimeter of said compartments (15) housing the coils (16).

2. The linear motor of claim 1, wherein said interruptions (21) are formed on at least a lateral segment of a relative housing compartment (15).

3. The linear motor of claim 1, wherein said interruptions (21) are formed on at least an upper or lower segment of a relative housing compartment (15).

4. The linear motor of claim 1, wherein said armature (14) is formed from at least two half-bodies (18a, 18b) which are coupled together.

5. The linear motor of claim 4, wherein said half-bodies (18a, 18b) are coupled in a substantially vertical plane.

6. The linear motor of claim 4, wherein said half-bodies (18a, 18b) are coupled in a substantially horizontal plane.

7. The linear motor of claim 4, wherein said half-bodies (18a, 18b) are substantially specular, each half body defining a half of said armature (14).

8. The linear motor of claim 4, wherein said half-bodies (18a, 18b), once coupled, define casting fissures (19) into which an insulating material in a liquid or molten state is cast.

9. The linear motor of claim 8, wherein said insulating material is a polymerizable resin.

10. The linear motor of claim 1, wherein said armature (14) is configured to contain a number of coils equal to a multiple of two (16a, 16b), the coils being adjacent each other on a plane transverse to the direction of movement.

11. The linear motor of claim 10, wherein the coils (16a, 16b) are formed by continuously winding a conductor (17).

12. The linear motor of claim 11, wherein said conductor (17) has respective first and second ends (17a, 17b) for input/output of current, each of said first and second ends (17a, 17b) emerging from the outer periphery of the coils (16a, 16b), respectively, and being contained within the lateral plane of each respective coil (16a, 16b).

13. The linear motor of claim 1, wherein said armature (14) includes at least one module defining a plurality of compartments (15) configured to house respective coils (16) aligned in the direction of movement, the longitudinal development of said module being such as to cover an even number of permanent magnets (12).

14. The linear motor of claim 13, wherein said at least one module houses a number of coils (16) equal to a multiple of two.

15. The linear motor of claim 13, wherein said at least one module houses a number of coils (16) equal to a multiple of three.

16. The linear motor of claim 1, wherein a distance "p" between two adjacent compartments (15) is equal to or less than the distance between two adjacent permanent magnets (12).

17. A method of manufacturing an electric motor including an armature having first and second sides and equipped with a plurality of compartments (15) configured to stably house respective electric coils (16) therein, the motor including two fixed bars (22), each bar cooperating with the respective first or second side of said armature, the bars having a plurality of permanent magnets (12) mounted thereto and arranged, during use, facing said electric coils (16), the method comprising: forming said armature (14) from at least two mateable bodies (18a, 18b) made substantially of aluminium or its alloys or of ceramic material, said bodies configured to be coupled together and defining, once assembled, the plurality of compartments (15), casting an insulating and binding material (20) such as a polymerizable resin in its liquid or molten state into fissures (19) defined between said at least two mateable bodies (18a, 18b), and polymerizing said insulating and binding material, the armature functioning as a mold for the casting and polymerization of said insulating and binding material (20).

18. The method of claim 17, wherein said polymerization is performed cold.

19. The method of claim 17, wherein said polymerization is performed hot.

* * * * *

UNITED STATES PATENT AND TRADEMARK OFFICE
CERTIFICATE OF CORRECTION

PATENT NO. : 6,847,133 B2 Page 1 of 1
APPLICATION NO. : 10/321329
DATED : January 25, 2005
INVENTOR(S) : Gisulfo Baccini It is certified that error appears in the above-identified patent and that said Letters Patent is hereby corrected as shown below:

Title Page, Section (76):

The address for the inventor should read -- Via Duca d'Aosta, 1-31030 Mignagola di Carbonera (IT) --.

Signed and Sealed this

Twenty-seventh Day of February, 2007

JON W. DUDAS
*Director of the United States Patent and Trademark Office*